(12) United States Patent
Nagura et al.

(10) Patent No.: US 10,288,062 B2
(45) Date of Patent: May 14, 2019

(54) GAS COMPRESSOR AND ABRASION STATE DETERMINING METHOD

(71) Applicant: Kobe Steel, Ltd., Kobe-shi (JP)

(72) Inventors: Kenji Nagura, Takasago (JP); Hitoshi Takagi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 515 days.

(21) Appl. No.: 14/219,359

(22) Filed: Mar. 19, 2014

(65) Prior Publication Data
US 2014/0314584 A1 Oct. 23, 2014

(30) Foreign Application Priority Data

Apr. 22, 2013 (JP) .................................. 2013-089465

(51) Int. Cl.
*B28C 5/42* (2006.01)
*F04B 51/00* (2006.01)
(Continued)

(52) U.S. Cl.
CPC ............ *F04B 51/00* (2013.01); *F04B 39/123* (2013.01); *F04B 53/143* (2013.01); *F16J 9/00* (2013.01);
(Continued)

(58) Field of Classification Search
CPC ...... F04B 51/00; F04B 53/143; F04B 39/123; F04B 2205/09; F16J 9/00; F16J 15/56; F16J 15/3296
(Continued)

(56) References Cited

U.S. PATENT DOCUMENTS 3,392,983 A 7/1968 Hajner
5,108,264 A * 4/1992 Abdel-Rahman ............... F04B 11/0075
417/20
(Continued)

FOREIGN PATENT DOCUMENTS

EP 1 069 312 A1 1/2001
JP 2005-155486 6/2005

OTHER PUBLICATIONS

Extended European Search Report dated Sep. 5, 2014, in European Patent Application No. 14161022.0.

*Primary Examiner* — Essama Omgba
*Assistant Examiner* — Stephen Mick
(74) *Attorney, Agent, or Firm* — Oblon, McClelland, Maier & Neustadt, L.L.P.

(57) ABSTRACT

A gas compressor of the present invention includes a reciprocating member, an accommodation portion, and a sealing portion, and the accommodation portion includes a compression chamber that compresses a gas and a non-compression chamber that is separated from the compression chamber by the reciprocating member and the sealing portion. Further, since the compression chamber includes a suction line that suctions a hydrogen gas, a discharge line that discharges a compressed gas, a connection line that is connected to the accommodation portion and is used so that at least a part of a gas flows therethrough when a gas passing through the sealing portion from the compression chamber exists, a flowmeter that is provided in the connection line, and a determination unit that determines whether a flow amount measured by the flowmeter is equal to or larger than a predetermined threshold value, it is possible to easily determine the abrasion state of the sealing portion.

1 Claim, 1 Drawing Sheet

(51) Int. Cl.
   *F04B 39/12*     (2006.01)
   *F04B 53/14*     (2006.01)
   *F16J 9/00*      (2006.01)
   *F16J 15/3296*   (2016.01)
   *F16J 15/56*     (2006.01)

(52) U.S. Cl.
   CPC ........... *F16J 15/3296* (2013.01); *F16J 15/56* (2013.01); *F04B 2205/09* (2013.01)

(58) Field of Classification Search
   USPC .......................................................... 417/53
   See application file for complete search history.

(56) References Cited

U.S. PATENT DOCUMENTS

| | | | |
|---|---|---|---|
| 5,112,196 A * | 5/1992 | Schuh | F04B 51/00 417/53 |
| 5,129,790 A * | 7/1992 | Ohnuma | F04B 53/164 417/63 |
| 5,563,351 A | 10/1996 | Miller | |
| 6,835,490 B1 * | 12/2004 | Okada | C01B 3/0031 148/421 |
| 8,215,922 B2 * | 7/2012 | Berger | F04B 11/0075 417/205 |
| 2007/0160484 A1 * | 7/2007 | Inoue | F04B 37/12 417/437 |
| 2008/0012236 A1 | 1/2008 | Reilly | |
| 2008/0229845 A1 * | 9/2008 | Minard | B67D 1/0855 73/861.08 |
| 2013/0099931 A1 | 4/2013 | Wetherill et al. | |

\* cited by examiner

GAS COMPRESSOR AND ABRASION STATE DETERMINING METHOD

BACKGROUND OF THE INVENTION

Field of the Invention

The present invention relates to a reciprocation type compressor that compresses a gas.

Description of the Related Art

Hitherto, there is known a reciprocation type compressor that compresses a hydrogen gas. For example, JP 2005-155486 A discloses a hydrogen gas compressor that includes a cylinder, a piston disposed inside the cylinder, a suction line that suctions a hydrogen gas into the cylinder, and a discharge line that discharges the hydrogen gas compressed inside the cylinder. The inside of the cylinder is divided into a compression chamber and a non-compression chamber by the piston. The compression chamber is a space that is connected to the suction line and compresses the hydrogen gas suctioned from the suction line. The non-compression chamber is a space that is located at the opposite side to the compression chamber with the piston interposed therebetween. The hydrogen gas compressor is used in, for example, a hydrogen station.

SUMMARY OF THE INVENTION

Generally, in a compressor like the related art, a piston ring is attached to the piston, and the discharge line is provided with a flowmeter that detects a flow amount of a compressed gas. Here, the abrasion state of the piston ring may be determined by using the flow amount measured by the flowmeter. Specifically, when the discharge flow amount measured by the flowmeter is smaller than a predetermined value during the operation of the compressor, it is determined that the flow amount of the hydrogen gas leaking from the compression chamber to the non-compression chamber through the gap between the inner surface of the cylinder and the piston ring exceeds a predetermined amount, that is, the piston ring is abraded. Here, since the compressed gas is the hydrogen gas in the hydrogen gas compressor, the flowmeter needs to have hydrogen embrittlement resistance. Further, the flowmeter needs to have strength capable of withstanding a high pressure. Such a flowmeter is very expensive. Further, in a case where the hydrogen gas is directly charged into a tank installed in a vehicle, the suction condition or the discharge condition of the compressor changes with time and the compressor operation time is short. For this reason, it is extremely difficult to determine the flow amount of the hydrogen gas leaking from the compression chamber to the non-compression chamber, that is, the abrasion state of the piston ring based on the discharge flow amount of the hydrogen gas flowing through the discharge line.

An object of the present invention is to provide a gas compressor capable of easily determining an abrasion state of a sealing portion and a determining method thereof.

In order to solve the above-described problems, the present invention provides a gas compressor including: a reciprocating member that moves in a reciprocating manner in the axial direction; an accommodation portion that accommodates the reciprocating member and includes a compression chamber compressing a gas by the reciprocating member and a non-compression chamber separated from the compression chamber; an annular sealing portion that is attached to one of the accommodation portion and the reciprocating member, the annular sealing portion separating the non-compression chamber from the compression chamber together with the reciprocating member; a suction line that suctions the gas into the compression chamber; a discharge line that discharges the gas compressed inside the compression chamber to the outside of the accommodation portion; a connection line that is connected to the accommodation portion and is used so that at least a part of a gas flows therethrough when a gas passing through the sealing portion from the compression chamber exists; a flowmeter that is provided in the connection line and measures a gas flow amount; and a determination unit that determines whether the gas flow amount measured by the flowmeter is equal to or larger than a predetermined threshold value.

In the present invention, the gas that leaks from the compression chamber is introduced into the connection line. Since the connection line is provided with the flowmeter, the abrasion state of the sealing portion is determined with high precision. That is, the flow amount of the gas leaking from the compression chamber to the non-compression chamber is directly obtained by measuring the flow amount of the gas flowing through the connection line instead of the method of the related art indirectly obtaining the gas leaking from the compression chamber to the non-compression chamber based on the discharge flow amount of the gas flowing through the discharge line. Accordingly, it is possible to highly precisely determine the abrasion state of the sealing portion based on the flow amount measured by the flowmeter. Further, since the pulsation of the flow amount of the gas flowing through the connection line is smaller than the pulsation of the flow amount of the gas flowing through the discharge line, the precision in the determination of the abrasion state of the sealing portion may be improved. Further, since the pressure inside the connection line is lower than the pressure inside the discharge line, the flowmeter does not need to have high pressure resistance, and hence an inexpensive flowmeter may be used.

In this case, the gas compressor may further include a check valve that is located at the downstream side of the flowmeter in the connection line and prevents the flow of the gas from the connection line toward the accommodation portion.

With such a configuration, the precision degradation of the flowmeter is suppressed.

Further, in the present invention, the connection line may be connected to the suction line.

With such a configuration, the hydrogen gas may be effectively used by collecting the leaking gas.

In this case, the gas compressor may further include a second connection line that leads a part of a gas passing through the sealing portion from the compression chamber to a member having a pressure lower than that of the suction line, wherein the sealing portion may include a plurality of ring members that are disposed between the accommodation portion and the reciprocating member, wherein the connection line may be located in the range where the existence range of the sealing portion in the accommodation portion while the volume of the compression chamber is the largest and the existence range of the sealing portion in the accommodation portion while the volume of the compression chamber is the smallest overlap with each other, wherein the other connection line may be located between the connection line and the non-compression chamber or may be located in the non-compression chamber, and wherein the determination unit may determine whether the sum of the gas flow amounts of the connection line and the other connection line is equal to or larger than a second threshold value.

With such a configuration, the leaking gas may be collected with high efficiency.

Further, the present invention provides an abrasion state determining method that is used in a gas compressor including an accommodation portion, a reciprocating member disposed inside the accommodation portion and moving relative to the accommodation portion, and an annular sealing portion attached to one of the accommodation portion and the reciprocating member and that determines the abrasion state of the sealing portion, wherein the gas compressor includes a suction line that suctions the gas into a compression chamber of the accommodation portion, a discharge line that discharges the gas compressed inside the compression chamber of the accommodation portion to the outside of the accommodation portion, and a connection line that is connected to the accommodation portion and is used so that at least a part of a gas flows therethrough when a gas passing through the sealing portion from the compression chamber exists, and wherein when the flow amount of the gas flowing through the connection line is measured and the measured flow amount becomes equal to or larger than a predetermined threshold value, it is determined that the sealing portion is abraded.

According to the present invention, the flow amount of the gas leaking from the compression chamber to the non-compression chamber is directly measured by measuring the flow amount of the gas flowing through the connection line instead of the method of the related art of indirectly obtaining the flow amount of the gas from the compression chamber to the non-compression chamber based on the discharge flow amount of the gas flowing through the discharge line. Accordingly, the abrasion state of the sealing portion may be determined with high precision. Since the pulsation of the gas flowing through the connection line is smaller than the pulsation of the gas flowing through the discharge line, the precision in the determination of the abrasion state of the sealing portion may be improved. Further, since the pressure inside the connection line is lower than the pressure inside the discharge line, the flowmeter does not need to have high pressure resistance, and hence an inexpensive flowmeter may be used.

As described above, according to the present invention, it is possible to provide a gas compressor capable of easily determining an abrasion state of a sealing portion and a determining method thereof.

DESCRIPTION OF THE PREFERRED EMBODIMENTS

First Embodiment

A reciprocation type hydrogen gas compressor of a first embodiment of the present invention and a method of determining an abrasion state of a sealing portion used therein will be described by referring to FIG. 1. The hydrogen gas compressor of this embodiment is used in a hydrogen station or the like.

Figure 1:
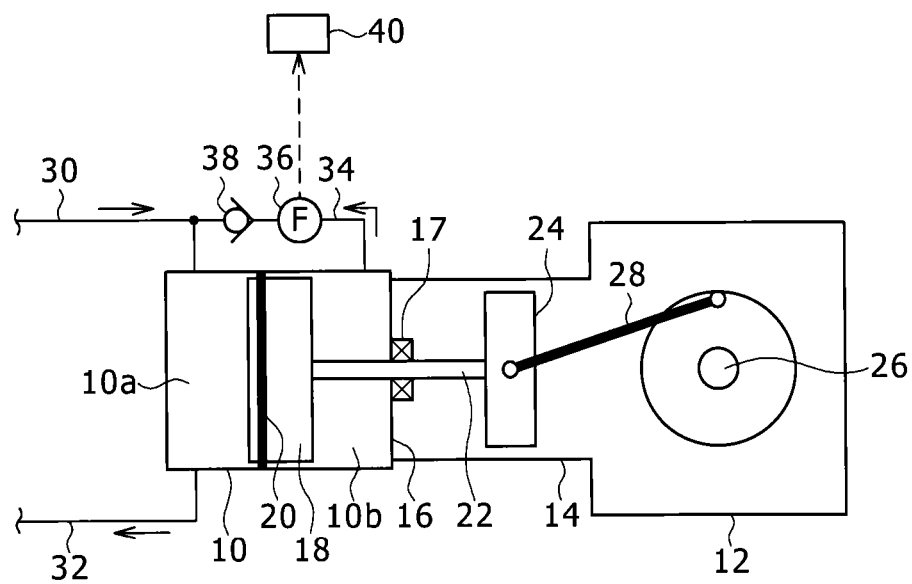
FIG. 1 is a view illustrating a schematic configuration of a hydrogen gas compressor of a first embodiment of the present invention.

As illustrated in FIG. 1, the hydrogen gas compressor of this embodiment includes a piston 18 that is a reciprocating member, a cylinder 10 that is an accommodation portion accommodating the piston 18, a crank casing 12, a cross guide 14, a partition wall 16, a piston ring 20, a piston rod 22, a cross head 24, a crank shaft 26, a connecting rod 28, a suction line 30, a discharge line 32, a connection line 34, a flowmeter 36, a check valve 38, and a determination unit 40. The cross guide 14 is provided between the cylinder 10 and the crank casing 12. Furthermore, the cross guide 14 may be recognized as a part of the accommodation portion. The partition wall 16 is used to divide the cylinder 10 and the cross guide 14. The piston ring 20 as the sealing portion is attached to the piston 18. The piston rod 22 penetrates the partition wall 16 and an oil draining member 17, and is connected to the piston 18. The cross head 24 is connected to a portion of the piston rod 22 at the side opposite to the connection side of the piston 18, and moves in a reciprocating manner inside the cross guide 14. The crank shaft 26 is provided inside the crank casing 12, and is rotationally driven by a motor. The connecting rod 28 is used to connect the crank shaft 26 to the cross head 24. The suction line 30 suctions a hydrogen gas into the cylinder 10. The discharge line 32 discharges the hydrogen gas compressed inside the cylinder 10 to the outside of the cylinder 10. The connection line 34 connects the cylinder 10 to the suction line 30. The flowmeter 36 is provided in the connection line 34. The check valve 38 is provided at the downstream side of the flowmeter 36 in the connection line 34.

The inside of the cylinder 10 is divided into a compression chamber 10a and a non-compression chamber 10b by the piston 18 and the piston ring 20. The compression chamber 10a is a space that is connected to the inside of the suction line 30 and the inside of the discharge line 32 and compresses the hydrogen gas suctioned from the suction line 30. The non-compression chamber 10b is a space that is separated from the compression chamber 10a by the piston 18 and the piston ring 20, and is connected to the inside of the connection line 34.

The piston ring 20 is an annular member that is fitted to a groove formed in the outer peripheral surface of the piston 18. The piston ring 20 has a function of suppress the gas inside the compression chamber 10a from leaking to the non-compression chamber 10b by filling a gap between the outer peripheral surface of the piston 18 and the inner peripheral surface of the cylinder 10.

The crank shaft 26 is rotationally driven by a motor (not illustrated). The rotational movement of the crank shaft 26 is transmitted to the cross head 24 through the connecting rod 28, so that the rotational movement is converted into the reciprocating movement in the direction connecting the cylinder 10 of the piston 18 to the crank casing 12. Accordingly, the piston 18 moves in a reciprocating manner along the inner peripheral surface of the cylinder 10.

The connection line 34 causes the non-compression chamber 10b inside the cylinder 10 to communicate with the suction line 30. For this reason, the hydrogen gas that leaks from the compression chamber 10a to the non-compression chamber 10b is returned to the suction line 30 through the connection line 34.

The flowmeter 36 measures the hydrogen gas flowing through the connection line 34, that is, the flow amount of the hydrogen gas that flows from the non-compression chamber 10b toward the suction line 30.

The check valve 38 allows the hydrogen gas to flow from the non-compression chamber 10b toward the suction line 30 and prevents the hydrogen gas from flowing from the suction line 30 toward the non-compression chamber 10b. Thus, the suction line 30 does not fluidically connect to the non-compression chamber 10b to permit gas to be suctioned into the non-compression chamber 10b via the suction line 30 during any phase of the reciprocating movement of the piston 18. In this embodiment, the check valve 38 is provided at the downstream side of the flowmeter 36 in the connection line 34. Further, as is shown in the figures, since the discharge line 32 is connected to the compression chamber 10a, it also does not fluidically connect to the non-compression chamber 10b.

When the hydrogen gas compressor is driven, the determination unit 40 determines whether the value measured by the flowmeter 36 is equal to or larger than a predetermined threshold value. When the value of the flowmeter 36 becomes equal to or larger than the threshold value, the determination unit 40 sends information that may be recognized by a manager that manages the operation state of the hydrogen gas compressor. For example, the determination unit sends a warning sound. Accordingly, the manager may recognize a state where the piston ring 20 is abraded. Further, the determination unit 40 detects the measurement value of the flowmeter 36 several times for 10 seconds to 1 minute, and determines whether the average value thereof exceeds the threshold value.

In this embodiment, the threshold value is set to, for example, about 10% to 20% of the total flow amount Q of the hydrogen gas flowing through the suction line 30. Furthermore, the threshold value is not limited to the above-described range, and may be appropriately modified in accordance with the type of the hydrogen gas compressor. Here, the total flow amount Q of the hydrogen gas is measured by the flowmeter provided in the suction line 30 or is calculated by the following equation (1).

$$Q = PD \cdot Ev \quad (1)$$

Here, PD indicates the compression volume, and is calculated by the following equation (2). Further, Ev indicates the volumetric efficiency, and is calculated by the following equation (3).

$$PD = \frac{\pi}{4} \cdot D^2 \times St \times \frac{RPM}{60} \quad (2)$$

Here, D indicates the inner diameter of the cylinder 10, St indicates the stroke of the piston 18, and RPM indicates the rotation speed of the motor.

$$Ev = 1 - Cl\left\{\frac{Zs}{Zd}\left(\frac{Pd}{Ps}\right)^{1/\kappa} - 1\right\} \quad (3)$$

Here, Cl indicates the clearance ratio, Ps indicates the suction pressure (the absolute pressure), Pd indicates the discharge pressure (the absolute pressure), Zs indicates the compression coefficient of the suction condition, Zd indicates the compression coefficient of the discharge condition, and κ indicates the specific heat ratio. Further, Cl is a value that is obtained by dividing the volume of the compression chamber 10a while the piston 18 is located at the top dead center by a change in the volume of the compression chamber 10a when the piston 18 is displaced from the top dead center to the bottom dead center.

Next, the operation state of the hydrogen gas compressor of this embodiment will be described.

When the motor (not illustrated) is driven, the piston 18 moves in a reciprocating manner in the axial direction as described above. When the piston 18 is displaced toward the crank casing 12 (toward the bottom dead center), the hydrogen gas is suctioned from the suction line 30 into the compression chamber 10a. Subsequently, when the piston 18 is displaced toward the compression chamber 10a (toward the top dead center), the hydrogen gas is compressed inside the compression chamber 10a and is discharged to the discharge line 32. At this time, there is a case in which the hydrogen gas passes between the inner surface of the cylinder 10 and the piston ring 20 and slightly leaks from the compression chamber 10a to the non-compression chamber 10b. In this case, the hydrogen gas is led to the suction line 30 through the connection line 34. At this time, the flowmeter 36 measures the flow amount of the hydrogen gas flowing through the connection line 34.

Then, when the value measured by the flowmeter 36 becomes equal to or larger than the threshold value, the determination unit 40 sends a predetermined signal such as a warning sound.

As described above, in the hydrogen gas compressor of this embodiment, the hydrogen gas that passes between the inner surface of the cylinder 10 and the piston ring 20 and leaks from the compression chamber 10a to the non-compression chamber 10b is introduced into the connection line 34. Since the connection line 34 is provided with the flowmeter 36, the abrasion state of the piston ring 20 is determined with high precision. That is, the flow amount of the hydrogen gas that leaks from the compression chamber 10a to the non-compression chamber 10b is directly obtained by measuring the flow amount of the hydrogen gas flowing through the connection line 34 instead of the method of the related art indirectly obtaining the flow amount of the hydrogen gas that leaks from the compression chamber 10a to the non-compression chamber 10b based on the discharge flow amount of the hydrogen gas flowing through the discharge line 32. Accordingly, it is possible to highly precisely determine the abrasion state of the piston ring 20 based on the flow amount measured by the flowmeter 36.

Further, even in a case where the hydrogen gas is directly charged to a supply target, the pulsation of the flow amount of the hydrogen gas flowing through the connection line 34 is smaller than the pulsation of the flow amount of the hydrogen gas flowing through the discharge line 32. For this reason, the precision in the determination of the abrasion state of the piston ring 20 may be improved. Further, since the pressure inside the connection line 34 is substantially equal to the pressure inside the suction line 30 and is lower than the pressure inside the discharge line 32, the flowmeter 36 does not need to have high pressure resistance, and hence the inexpensive flowmeter 36 may be used.

Further, in this embodiment, since the connection line 34 is provided with the check valve 38, the precision degradation of the flowmeter 36 is suppressed. That is, since the pressure of the non-compression chamber 10b decreases when the piston 18 is displaced toward the compression chamber 10a (toward the top dead center), there is a concern that the hydrogen gas flowing through the suction line 30 may flow to the non-compression chamber 10b through the connection line 34. In this case, there is a concern that an abrupt change in the measurement value of the flowmeter 36 may cause the precision degradation of the flowmeter 36.

However, in this embodiment, since the connection line 34 is provided with the check valve 38, it is possible to suppress the hydrogen gas flowing through the suction line 30 from passing through the flowmeter 36. Accordingly, the precision degradation of the flowmeter 36 is effectively suppressed. The same applies to the following embodiment.

Second Embodiment

Figure 2:
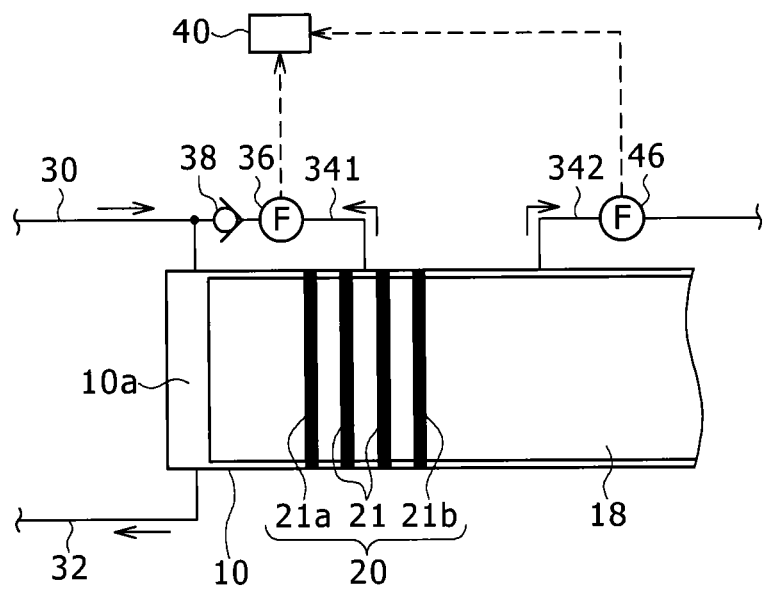
FIG. 2 is a view illustrating a schematic configuration of a hydrogen gas compressor of a second embodiment of the present invention.

FIG. 2 is a view illustrating a schematic configuration of a hydrogen gas compressor of a second embodiment of the present invention. Furthermore, in the second embodiment, only the difference from the first embodiment will be described, and the structure, the operation, and the effect which are the same as those of the first embodiment will not be described.

In this embodiment, an annular sealing portion 20 is formed by a plurality of ring members 21 that are intermittently disposed along the axial direction of the piston 18 as the reciprocating member. In the description below, the ring member disposed so as to be closest to the compression chamber 10a (the left side of FIG. 2) among the plurality of ring members 21 is referred to as a "compression chamber side ring member 21a", and the ring member disposed so as to be closest to the non-compression chamber 10b (the right side of FIG. 2) is referred to as a "non-compression chamber side ring member 21b".

The hydrogen gas compressor includes a connection line 341 that is connected to the cylinder 10 and the suction line 30 and the other connection line 342 that is connected to a member (not illustrated) having a pressure lower than those of the cylinder 10 and the suction line 30. Hereinafter, the connection line 341 is referred to as the "first connection line 341", and the connection line 342 is referred to as the "second connection line 342".

The first connection line 341 is provided in the range where the existence range of the sealing portion 20 in the cylinder 10 while the volume of the compression chamber 10a is the largest and with the existence range of the sealing portion 20 in the cylinder 10 while the volume of the compression chamber 10a is the smallest overlap with each other. Here, the existence range of the sealing portion 20 is the range where the portion between the compression chamber side ring member 21a and the non-compression chamber side ring member 21b exists. In this embodiment, the hydrogen gas that has a comparatively high pressure and leaks from the compression chamber 10a between the plurality of ring members 21 is returned to the suction line 30 through the first connection line 341. The second connection line 342 is connected to the position near the non-compression chamber 10b (the right side of FIG. 2) in relation to the position of the non-compression chamber side ring member 21b in the cylinder 10 while the volume of the compression chamber 10a is the largest between the cylinder 10 and the piston 18. The second connection line 342 is also provided with a flowmeter 46. Since the hydrogen gas that has a relatively low pressure and leaks from the compression chamber 10a to the non-compression chamber 10b cannot be returned to the suction line 30 having a relatively high pressure, the hydrogen gas is sent to a member (not illustrated) having a pressure lower than that of the suction line 30 through the second connection line 342.

When the hydrogen gas compressor is driven, the determination unit 40 determines whether the sum of the values of the flowmeters 36 and 46 is equal to or larger than a predetermined threshold value. When it is determined that the sum is equal to or larger than the threshold value, the abrasion state of the sealing portion 20 is notified to the manager. In this embodiment, since the connection lines 341 and 342 are respectively provided with the flowmeters 36 and 46 as in the first embodiment, the abrasion state of the sealing portion 20 may be determined with high precision.

Furthermore, it should be understood that the embodiments disclosed herein are merely examples and do not limit the present invention in all respects. The scope of the present invention is expressed by claims instead of the description of the above-described embodiments, and further includes the meaning equivalent to claims and all modifications within the scope.

For example, in the above-described embodiments, an example has been described in which the flowmeter is provided in the suction line 30 so as to detect the total flow amount Q of the hydrogen gas, but the flowmeter may be provided in the discharge line 32. In this case, the discharge amount may be measured by the flowmeter.

Further, in the above-described embodiments, an example has been described in which the threshold value is set to 10% to 20% of the total flow amount Q of the hydrogen gas, but a specific absolute value may be set as the threshold value.

In the first embodiment, the number of the connection lines 34 may be two or more. The plurality of connection lines 34 may be connected to one flowmeter 36 or the flowmeter may be provided in each connection line 34. Even in the second embodiment, a plurality of first connection lines 341 may be provided. Also, a plurality of second connection lines 342 may be provided.

In the first embodiment, the sealing portion 20 may be formed by a plurality of ring members. Further, the connection line 34 may not be essentially provided in the non-compression chamber 10b as long as the connection line is provided near the non-compression chamber 10b in relation to the existence range of the sealing portion 20 in the cylinder 10 while the volume of the compression chamber 10a is the largest.

In the second embodiment, the second connection line 342 may be directly connected to the non-compression chamber that is located at the opposite side to the compression chamber 10a of the piston 18. Here, the abrasion state may be determined based on only the gas flow amount of the first connection line 341 or the abrasion state may be determined based on only the gas flow amount of the second connection line 342.

The method of determining the abrasion state of the sealing portion 20 may be used in a compressor in which a rod seal as a sealing portion is attached to the inner peripheral surface of the cylinder 10. Furthermore, in a case where a part of the hydrogen gas leaks from the compression chamber 10a toward the non-compression chamber 10b, the hydrogen gas passes between the rod seal and the outer peripheral surface of the plunger as the reciprocating member.

Further, in the first embodiment, an example has been described in which the connection line 34 connects the cylinder 10 to the suction line 30, but the connection line 34 may connect the cylinder to the upstream portion, which has a pressure substantially equal to the pressure of the suction line 30 or smaller than the pressure thereof, of the suction line 30 (for example, the compressor suction line that is located at the upstream side of the hydrogen gas compressor and has a pressure lower than that of the hydrogen gas compressor). The same applies to the first connection line 341 of the second embodiment. The method of determining the abrasion state of the sealing portion 20 may be used in a compressor that compresses a gas other than hydrogen.

What is claimed is:

1. A gas compressor, comprising:
   a reciprocating member that moves in a reciprocating manner in the axial direction;
   an accommodation portion that accommodates the reciprocating member and includes a compression chamber compressing a gas by the reciprocating member and a non-compression chamber separated from the compression chamber;
   an annular sealing portion that is attached to one of the accommodation portion and the reciprocating member, the annular sealing portion separating the non-compression chamber from the compression chamber together with the reciprocating member;
   a suction line that suctions the gas into the compression chamber;
   a discharge line that discharges the gas compressed inside the compression chamber to the outside of the accommodation portion;
   a connection line that communicates with a region in fluid communication with the non-compression chamber and with a region at the pressure of the suction line so as to allow at least a part of a gas passing through the sealing portion from the compression chamber to the non-compression chamber to flow therethrough to the region at the pressure of the suction line;
   a check valve in the connection line and arranged to prevent a flow of the gas from the region at the pressure of the suction line toward the non-compression chamber;
   a flowmeter that is provided in the connection line and measures a gas flow amount; and
   a determination unit that determines whether the gas flow amount measured by the flowmeter is equal to or larger than a predetermined threshold value,
   wherein the suction line does not fluidically connect to the non-compression chamber to permit gas to be suctioned into the non-compression chamber via the suction line during any phase of the reciprocating movement of the reciprocating member, and wherein the discharge line does not fluidically connect to the non-compression chamber during any phase of the reciprocating movement of the reciprocating member when no gas leakage past the annular sealing portion occurs.

* * * * *